United States Patent [19]

Hurley

[11] 3,955,713
[45] May 11, 1976

[54] COFFEE MAKING CONSOLE FOR AUTOMOBILES AND THE LIKE

[76] Inventor: Joseph A. P. Hurley, 17 Grand View Ave., Danbury, Conn. 06810

[22] Filed: Jan. 13, 1975

[21] Appl. No.: 540,511

[52] U.S. Cl............... 222/129.4; 222/145; 222/146 HE; 219/202
[51] Int. Cl.² ............ B67D 5/56
[58] Field of Search............ 222/129, 129.1, 129.3, 222/129.4, 130, 132, 133, 135, 144.5, 145, 146 H, 146 HE, 344, 361, 448, 362, 449, 450–453; 219/202, 385, 386, 521, 523; 141/104, 100

[56] References Cited
UNITED STATES PATENTS

| | | | |
|---|---|---|---|
| 1,904,756 | 4/1933 | Wooster | 222/361 |
| 2,533,930 | 12/1950 | Harr | 222/146 HE |
| 2,661,015 | 12/1953 | Allred et al. | 222/129 |
| 3,200,997 | 8/1965 | Creswick | 222/146 HE |
| 3,368,718 | 2/1968 | Janicek | 222/132 |
| 3,423,571 | 1/1969 | Trachtenberg et al. | 219/202 |
| 3,589,559 | 6/1971 | Colton | 222/146 HE |

Primary Examiner—Robert B. Reeves
Assistant Examiner—H. Grant Skaggs
Attorney, Agent, or Firm—Morse, Altman, Oates & Bello

[57] ABSTRACT

A portable console is provided for use in automobiles and other vehicles and from which hot drinks of coffee or the like may be dispensed. The console may be installed typically on the floor of an automobile, for example, on the passenger side of the transmission hump. The console includes a plurality of storage compartments adapted to contain such materials as water, sugar, instant coffee, powdered cream or the like with each compartment being provided with a valve for dispensing the contents of the chamber onto a common trough feeding into a filling station located below the trough. A detachable tank for water storage is provided for replenishing the water chamber which is provided with a heating element. The element may be energized by connecting a cord to the car's electrical system as through the cigarette lighter. A drain tank at the base of the console collects spillages and additional storage compartments are included for cups, spoons and the like.

3 Claims, 5 Drawing Figures

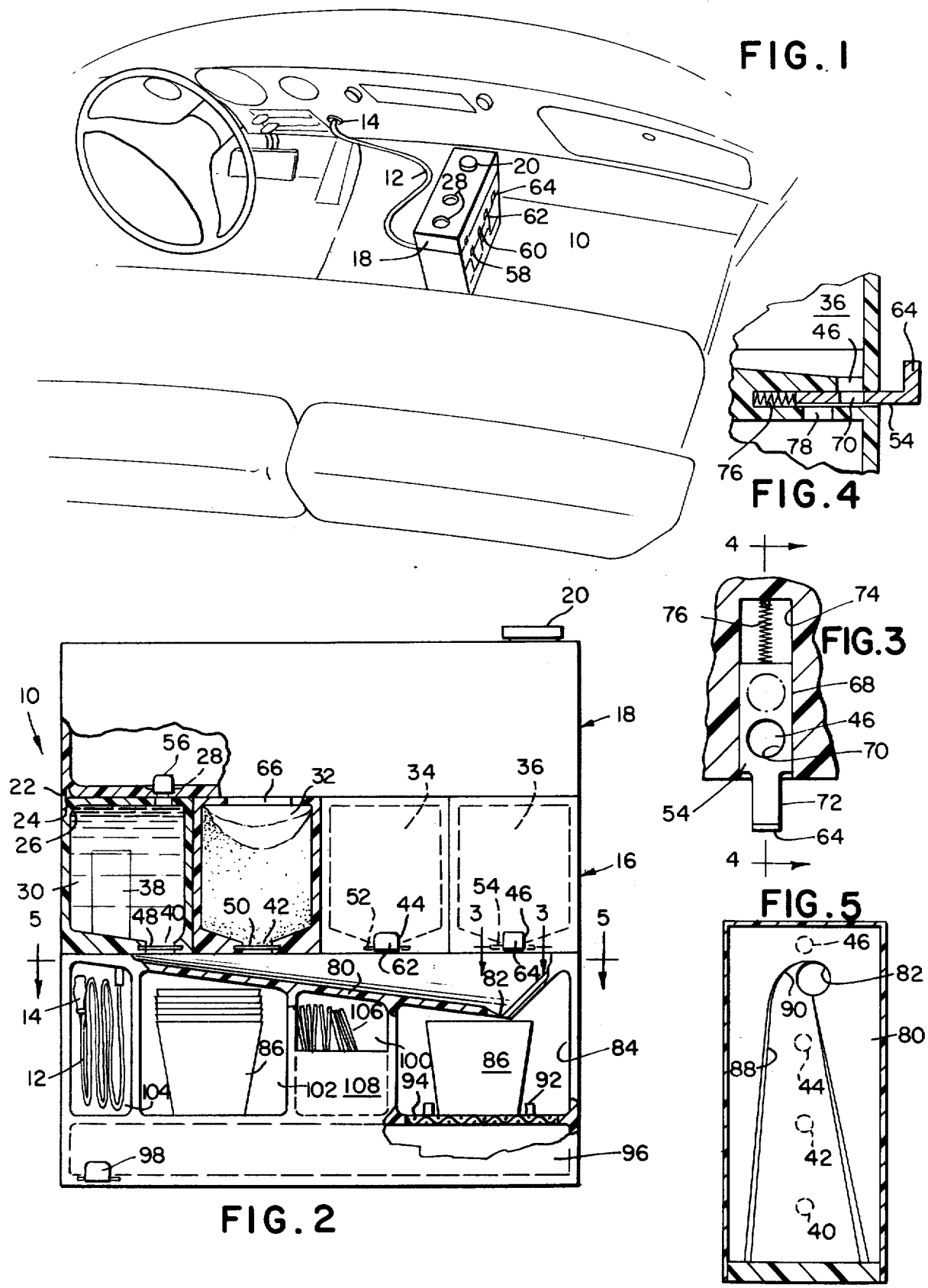

COFFEE MAKING CONSOLE FOR AUTOMOBILES AND THE LIKE

BACKGROUND OF THE INVENTION

1. Field of the Invention

This invention relates generally to portable units for use in heating and preparing liquid refreshments and more particularly is directed towards a self-contained, portable console for motor vehicles and from which fresh, hot drinks may be dispensed.

2. Description of the Prior Art

Travelers, especially those who do a considerable amount of driving, such as salesmen, truck drivers and the like often desire periodic cups of coffee for refreshment and to keep them alert while driving. Since many driving routes may not have restaurants conveniently located, drivers ofter times will bring a thermos bottle of coffee for consumption en route. Such thermoses, although in common use, have several disadvantages. First of all, their capacity is usually small and even if the insulation is efficient, the coffee will cool after several hours. Also, coffee that is stored in a premixed condition for any extended period tends to lose its flavor and in any event is not as desirable as freshly prepared coffee. While portable units have been available for heating liquid refreshments, generally these are used to warm or re-heat previously prepared coffee or the like.

Accordingly, it is an object of the present invention to provide a compact, portable console for temporary or permanent installation in automobiles and the like and adapted to prepare fresh cups of coffee or other liquid refreshments. Another object of this invention is to provide a simple, low cost, highly efficient console readily installable in a motor vehicle and adapted to prepare a variety of hot drinks quickly and easily without mess.

SUMMARY OF THE INVENTION

This invention features a portable console for making hot drinks in an automobile, truck or the like comprising a housing formed with a plurality of horizontally adjacent compartments each adapted to hold a different drink ingredient such as water, instant coffee, sugar and powdered cream, for example. A water storage tank is detachably connected to the top of the housing and drains through a valve to one of the chambers in the housing. The chamber communicating with the tank serves as the water storage chamber and is provided with an electrical heating element energized by a cord which may be plugged into the car's cigarette lighter socket. Extending below all of the compartments is a funneled trough with button actuated valves located at the bottom of the compartments for dispensing the contents of the compartments selectively and individually into the trough. A filling station adapted to hold a cup is located at the mouth of the trough and additional compartments are provided in the lower portion of the console for storing cups, spoons and the like.

BRIEF DESCRIPTION OF THE DRAWINGS

FIG. 1 is a fragmentary perspective view of a console made according to the invention in a typical automobile installation, FIG. 2 is a view in side elevation, partly broken away, of the console, FIG. 3 is a detailed side sectional view taken along the line 3—3 of FIG. 2, FIG. 4 is a cross-sectional view taken along the line 4—4 of FIG. 3, and, FIG. 5 is a cross-sectional view taken along the line 5—5 of FIG. 2.

DETAILED DESCRIPTION OF THE PREFERRED EMBODIMENT

Referring now to the drawings, the reference character 10 generally indicates a compact, portable console for use in dispensing various hot drinks such as coffee, and is adapted to be installed, permanently or temporarily, in a motor vehicle such as an automobile. In the FIG. 1 installation, the console 10 is conveniently mounted to the front floor of an automobile on the passenger side of the transmission hump. By locating the console in this position, it is readily accessible to both the driver and the front seat passenger. The size and shape of the console is such as not to interfere with the comfort of the passengers and the location also makes the unit easily connected to the car's electrical system by means of a cord 12 which, in the FIG. 1 embodiment, is provided with a jack 14 which may be readily plugged into the car's cigarette lighter socket, as shown. The console is relatively small, typically being on the order of perhaps 3–4 inches wide, 8–12 inches in length by about 1 ft. in height. These dimensions are only by way of example and obviously may be varied as desired over a broad range.

In order to stabilize the console in position, it may be attached to the vehicle by various means. One measure would be to include a layer of pressure-sensitive adhesive on the wall adjacent the transmission hump with the adhesive initially being covered by a release sheet. When the console is ready for installation, the sheet is peeled away and the console pressed against the hump to which it will adhere. Brackets or other mounting means may also be utilized.

The console 10 is generally organized into two main components comprisng a lower main housing 16 and an upper detachable tank 18 adapted to store a quantity of water for use in the console and which may be separated for refilling as required. The tank 18 is provided with a filling neck closed by a removable cap 20 by means of which the tank may be refilled from time to time. The tank dimensions generally correspond with the underlying main housing at least in length and width. Various means may be provided for detachably connecting the tank to the housing and, in practice, a simple rib and groove interlock is satisfactory. The interlock, as best shown in FIG. 2, is comprised of a depending flange 22 formed about the lower edge of the tank 18 and having an inwardly extending rib 24 adapted to snap into engagement with a cooperating groove 26 formed about the upper edge of the housing 16. In this fashion, the tank may be snapped on or off in a quick, easy fashion for filling as required. The tank 18 may be provided with a pair of circular recesses 28 formed in the top wall thereof to serve as cup holders for the drive and/or the passenger. Thus, between sips, the driver or passenger may safely set down a filled or partially filled cup while driving.

The tank is also provided with a drain valve 28 by means of which water stored in the tank 18 may be released into a water heating compartment 30 formed in the main housing 16. The housing 16, as best shown in FIG. 2, is formed with a plurality of horizontally adjacent compartments 30, 32, 34 and 36 adapted to store various ingredients needed to prepare coffee or other hot drinks. While the illustrated embodiments show four such compartments, obviously this number may be altered. In the illustrated embodment, the compartment 30 is utilized to store and heat water by means of an electrically energized heating element 38 such as a resistance coil or the like connected to the cord 12. The coil may be energized any time by plugging the jack 14 into the automobile's cigarette lighter socket. Alternatively, the coil may be directly wired to the car's electrical system through an appropriate switch. The compartment 32 may be used to store granular sugar while compartment 34 may contain powdered or granulated instant coffee and compartment 36 storing powdered cream. Obviously, different hot drink ingredients may be stored such as powdered cocoa, tea, boullion, etc.

In practice, the bottom wall of each compartment is inclined to provide a funelling action of the contents into drain ports 40, 42, 44 and 46 formed in the bottom of each compartment. Each port, 40 through 46, is provided with a spring-biased valve 48, 50, 52 and 54 by means of which the contents of the respective compartments may be selectively dispensed. Each valve is operated by means of its own button these being button 56 for the drain valve 28, button 58 for the valve 48, button 60 for the valve 50, button 62 for the valve 52 and button 64 for the valve 54. Each compartment is also formed with a relatively large opening in its top wall such as opening 66 through which each compartment is refilled. These openings are normally covered by the tank 18 but are readily accessable by merely removing the tank.

The valves 42, 44 and 46 are identical and are adapted to dispense metered amounts of coffee, powdered cream or the like when actuated. As best shown in FIGS. 3 and 4, the valve 54 is comprised of a flat slide portion 68 having an opening 70 formed therein. The slide portion 68 is formed with a reduced outer end 72 having an upturned free end serving as the button 64. The slide portion 68 is mounted for horizontal reciprocation within a cooperating recess 74 and is normally urged outwardly by means of a spring 76 trapped between the end of the slide portion and the end wall of the recess. The opening 70 preferably corresponds in volume with that of a teaspoon so that, when filled with sugar, powdered coffee or the like, a single teaspoon of that condiment will be in the valve opening 70. It will be understood from FIG. 4 that, when the valve is in the extended position shown, the valve opening 70 will register with the chamber opening 46 to receive a charge of coffee, sugar, etc. When the condiment is to be dispensed, the button 64 is depressed causing the valve to slide inwardly so the valve opening 70 will register with an opening 78 offset from the opening 46 and formed in the bottom wall of the chamber above a through 80 extending under all of the storage chambers. In this fashion, a measured charge of coffee, sugar, etc., is dispensed on each actuation of the valve so that a driver may easily dispense a precise, measured amount of coffee, etc., into a cup without stopping to make his own measurements.

The valves 28 and 40 which dispense the water are similar in construction to the valves 42 through 46 with the exception that the openings in the bottom wall of each chamber are aligned with one another rather than offset with these openings normally being closed by the valve when in the usual extended position. The valve is opened by merely depressing the button so that the valve opening will register with the fixed aligned opening in order to discharge water either from the tank 18 into the chamber 30 or from the chamber 30 onto the trough 80.

The trough 80 as best shown in FIGS. 2 and 5 is in the form of a rectangular, shallow funnel formed with an opening 82 near one end thereof. The opening 82 is centrally located above a cup filling station 84 in which a cup 86 is placed for filling. The trough 80 extends under all of the chamber valve openings to receive the contents discharged therefrom. In practice, the dry materials, coffee, sugar, etc., should be discharged first onto the trough with the water being released last in order to wash the powdered or granulated materials down into the cup. To enhance the washing action of the water over the trough, the trough may be formed with a longitudinally extending, recessed channel 88 terminating in a curved section 90 about the opening 82. In this fashion, the water running down the trough will swirl about the trough before running into the cup and thereby insuring that all of the sugar, coffee, etc., is carried into the cup.

The cup filling station 34 is large enough to receive the cup 86 and, preferably, is provided with a collar or other abutment 92 on the bottom wall thereof as a means for stabilizing and centering the cup 86 placed therein for filling. Thus, the cup will be located below the trough opening 82 to insure the water and other condiments are fed into the cup. In practice, the bottom wall 94 of the cup filling station is foraminous in order to permit spillages to be drained down into a drain collection tank 96 extending along the bottom of the housing 16. The tank 96 is provided with a button-actuated valve 98 similar to that of the valve 28 by which the drain collection tank may be periodically emptied.

The lower portion of the housing 16 also includes storage recesses 100, 102 and 104. The recess 100 may be used to store stirrers 106 held in by means of a retaining wall 108 while the recess 102 may be used to store nested cups 86. The storage recess 104 is utilized to accommodate the cord 14 folded and stored therein when not in use.

The entire console may be fabricated from a variety of materials including metal, such as aluminum or various types of plastic such as PVC, acrylic, etc. The walls of the console may be opaque or transparent as desired.

Numerous modifications may be made to the invention. For example, the lower portion of the housing 16 may be provided with a door, hinged or sliding, for closing the filling station and other lower storage compartments when the unit is not in use. Also, additional storage compartments may be added for other condiments as desired. The coil 38 may be energized by its own battery and a thermostatically controlled warning light may be added to indicate when the water being heated in the compartment 30 has reached boiling temperature.

Having thus described the invention what I claim and desire to obtain by Letters Patent of the United States is:

1. A console for preparing hot drinks in an automobile or the like, comprising
   a. a housing,
   b. a tank detatchably connected to said housing and adapted to contain a quantity of potable water therein, said tank being formed with a filling port at the top thereof and a drain port at the bottom thereof, c. said housing being formed with a plurality of horizontally adjacent compartments each adapted to store a different drink ingredient and each compartment formed with a drain port at the bottom thereof and a filling port at the top thereof normally closed by said tank, d. heating means disposed in one of said compartment for heating water stored therein, e. a spring-loaded manually operated slide valve connected to said tank at the tank drain port and at the filling port of said one compartment for transferring water from said tank to said one compartment, f. an elongated funneled trough mounted to said housing below all of said compartments, g. a cup filling station disposed below said trough at the funnel opening thereof and adapted to receive a cup therein, and, h. a spring-loaded manually operated slide valve connected to each of said compartments at each respective compartment drain port in position to dispense water and other ingredients onto said trough, i. said tank being detachably connected to and coextensive with the top of said housing, j. an electrical cord connected to said heating means at one end and detachably connected at the other end to the electrical system of said automobile, k. each of said slide valves associated with said other compartments including metering means for dispensing a measured amount of ingredient from its associated compartment onto said trough.

2. A console according to claim 1 wherein each of said valves associated with said other compartments includes a slide valve member mounted for horizontal sliding movement in the bottom wall of each compartment, each slide valve having an exposed outer end for actuation of said valve, spring means normally urging said slide valve member outwardly, said slide valve member being formed with an opening of predetermined volume, said bottom wall being formed with one opening above and normally in register with said valve opening and another opening below and offset from said one opening, said valve opening adapted to register with said other opening upon sliding actuation of said slide valve member.

3. A console according to claim 1 including a drain collection tank integral with said housing and below said station.

* * * * *